(No Model.)

J. CORNELIUS.
LOOSE PULLEY AND WHEEL LUBRICATOR.

No. 319,073. Patented June 2, 1885.

Witnesses:
Louis M. T. Whitehead
C. L. Sundgren

Inventor:-
James Cornelius
by his Attorneys
Brown & Hall

UNITED STATES PATENT OFFICE.

JAMES CORNELIUS, OF BROOKLYN, NEW YORK.

LOOSE-PULLEY AND WHEEL LUBRICATOR.

SPECIFICATION forming part of Letters Patent No. 319,073, dated June 2, 1885.

Application filed October 13, 1884. (No model.)

*To all whom it may concern:*

Be it known that I, JAMES CORNELIUS, of the city of Brooklyn, in the county of Kings and State of New York, have invented a new and useful Improvement in Oiling Devices for Loose Pulleys and Wheels, of which the following is a specification, reference being had to the accompanying drawings.

The invention consists, essentially, in the combination, with an annular oil reservoir or chamber in the hub or box of a loose pulley or wheel, of one or more oil-ducts leading from said reservoir or chamber to the bore of said hub or box, and having their outer ends or orifices near the outer wall of said annular reservoir or chamber. When the pulley or wheel is in motion, the oil in the reservoir or chamber is caused by centrifugal force to keep against the outer wall thereof, and by having the outer ends or orifices of the oil-ducts close or near to the outer wall of said annular reservoir or chamber I insure a sufficient supply of oil to the axle or shaft or bore of the pulley or wheel until the contents of the reservoir or chamber are nearly or quite exhausted. I preferably employ oil-ducts which are inclined in reverse directions in the plane of rotation of the pulley or wheel, so that when said pulley or wheel is rotated in either direction the duct or ducts inclined in one direction will serve to feed oil to the bore and the duct or ducts inclined in a reverse direction serve as a vent or vents. I also have the inner orifices or ends of the reversely-inclined oil-ducts coincident or in line lengthwise of the hub, whereby, when the pulley or wheel is at rest and the oil in the reservoir reaches the inner orifices of the oil-ducts, the vent is sealed and leakage of oil prevented. I also combine with the oil reservoir or chamber and oil-ducts above described an annular groove or channel in the bore of the hub at the end thereof and ducts leading therefrom to the oil reservoir or chamber, for the purpose of permitting the return of oil from the bore to the reservoir by centrifugal force.

The above-described features are included in my invention.

Figure 1:
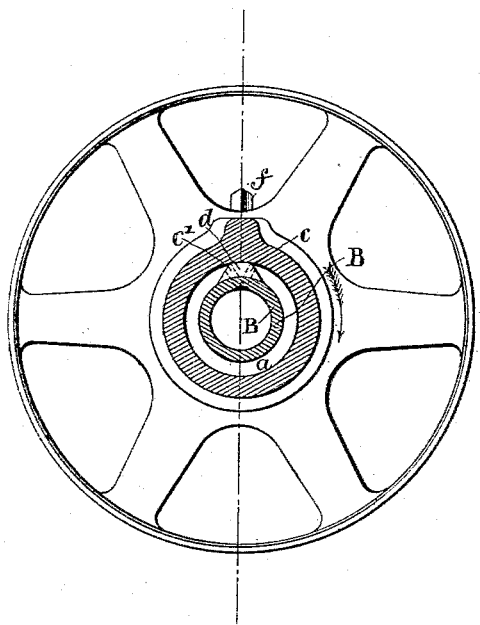
Figure 2:
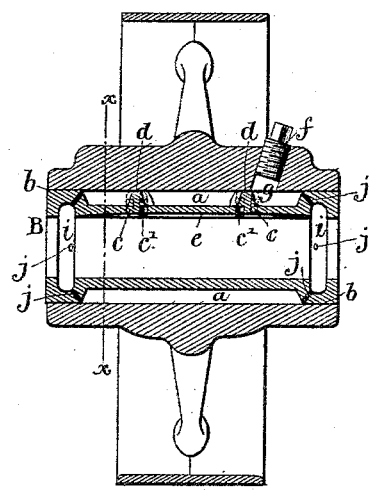
Figure 3:
Figure 4:
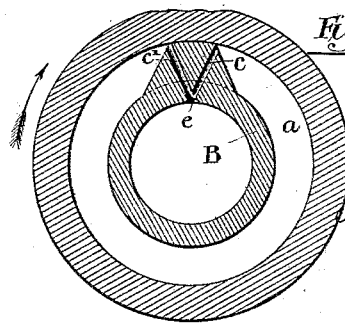

Figure 1 in the drawings is a side view of a loose pulley with my improvement, the hub being shown in section on the line $x$ $x$ of Fig. 2. Fig. 2 is an axial section of the same. Fig. 3 is an external longitudinal view of the bushing in which the oil-reservoir and the feed and vent ducts are formed. Fig. 4 is a transverse section on a larger scale of the pulley-hub, the oil-reservoir, and the feed and vent ducts.

Similar letters of reference indicate corresponding parts in the several figures.

$a$ is the annular oil reservoir or chamber provided within the hub A of the wheel. This might be formed by coring the hub, but is preferably formed, as represented, by fitting the hub with a bushing, B, in the outer circumference of which is an annular groove, $a'$, (see Fig. 3,) of a width nearly equal to the length of the hub and bushing, the flange-like portions $b$ $b$ of the said bushing outside of said groove being fitted tightly into the hub, as shown in Fig. 2.

$c$ $c'$ are the oil and vent ducts, the inner orifices of which are within the bore of the wheel or axle-box, and the outer orifices of which are brought as close or near to the outer circumference or wall of the annular oil reservoir or chamber as is consistent with the free ingress into them of oil from the said reservoir or chamber. These ducts might be made of short pieces of tubing inserted tightly into holes provided for them in the inner wall of the chamber $a;$ but I prefer to make them by providing projections $d$ on the bushing B and drilling holes in the said projections. The ducts $c$ $c$ have a tangential inclination in one direction, and those $c'$ $c'$ a corresponding inclination in the opposite direction, so that when the pulley rotates in the direction of the arrows (shown in Figs. 1 and 4) the ducts $c$ $c$ act as feed-ducts and those $c'$ $c'$ as vent-ducts, and when the pulley rotates in the opposite direction $c'$ $c'$ are feed-ducts and $c$ $c$ are vent-ducts. There may be a duct $c$ inclined one way and a duct $c'$ inclined the opposite way, exactly in line with each other in the same planes of revolution of the hub, so that their inner orifices meet to form one orifice or are coincident, as shown in Fig. 4; or $c$ and $c'$ may be situated at some distance apart, as shown in Figs. 2 and 3; but in any case the inner orifices should be all in one straight line along the bore of the hub, and when there are several separate inner orifices all should terminate in a slight groove, e, running lengthwise of the bore, as fully shown in Fig. 2 and dotted in Fig. 3. The oil may be supplied to the chamber a through any suitable supply-opening, as at g, Fig. 2, closed by a screw-plug, f, or other suitable means. In the rotation of a loose pulley or wheel the oil contained in an annular chamber within the hub is thrown by centrifugal force toward the outer circumferential wall of the said chamber, and therefore when there is very little oil in the chamber it will not pass freely through mere holes in the inner circumferential wall; but by providing ducts reaching, as described, nearly to the outer circumferential wall a free supply of oil is given while any or very little remains. By the inclination of the duct outward toward the direction in which the pulley is to run the oil is scooped into the ducts, and when two ducts or sets of ducts are provided inclined opposite ways the oil is thus scooped in whichever way the pulley or wheel rotates. By the arrangement of the two sets of oppositely-inclined ducts, so that their inner orifices come into one or are in one line lengthwise of the shaft or axle the vent is caused to be sealed when the wheel or pulley is at rest with the said inner orifices below the level of the oil in the chamber, and hence leakage of oil is prevented. Near each end of the bore of the hub there is formed around it an open channel or groove, i, communicating with the reservoir or chamber a near the outer circumference thereof by means of ducts j j, formed by drilling holes through the flange b into said grooves or channels. The oil which is received from the chamber or reservoir a through the ducts c or c′ between the shaft or axle and the bore of the hub working toward the ends of the bore is received in the channels i i, into the bottoms or outer parts of which it is thrown by the centrifugal force developed by the rotation of the pulley or wheel, and whence by the same force it is driven through the ducts j j back into the chamber or reservoir a. In this way the same oil is used over and over again for the lubrication of the bore of the pulley or wheel and the shaft or axle.

What I claim as my invention and desire to secure by Letters Patent is—

1. The combination, with an annular oil reservoir or chamber within the hub of a loose pulley or wheel, of one or more oil-ducts leading from said reservoir or chamber to the bore of the hub and having their outer ends or orifices near the outer wall of said annular reservoir or chamber, substantially as and for the purpose herein described.

2. The combination, with the hub or box of a loose pulley or wheel and an annular oil reservoir or chamber therein, of oil-ducts leading from the reservoir or chamber to the bore of the hub or box, having their outer ends or receiving-orifices near the outer wall of said annular reservoir or chamber and inclined in opposite directions in the plane of rotation of the pulley or wheel, substantially as and for the purpose herein described.

3. The combination, with the hub A and annular oil-chamber a therein, of oil-ducts c c′, inclined in opposite directions in the plane of rotation of the hub, having their outer ends or orifices near the outer wall of the chamber a, and their inner ends or orifices coincident or in the same line lengthwise of the hub, substantially as and for the purpose herein described.

4. The combination, with the hub A, containing the annular oil-chamber a, and having in the bore the circumferential channel i and a duct, j, between the channel i and said chamber a, of one or more oil-ducts leading from said chamber to the bore, and having their outer ends or orifices near the outer wall of said annular oil-chamber, substantially as and for the purpose herein described.

JAMES CORNELIUS.

Witnesses:
FREDK. HAYNES,
EMIL SCHWARTZ.